United States Patent
Wang

(10) Patent No.: US 10,444,436 B1
(45) Date of Patent: Oct. 15, 2019

(54) GENERATION OF AN OPTICAL BEAM WITH A STABLE WAVELENGTH

(71) Applicant: Northrop Grumman Systems Corporation, Falls Church, VA (US)

(72) Inventor: Ge Wang, Los Alamitos, CA (US)

(73) Assignee: NORTHROP GRUMMAN SYSTEMS CORPORATION, Falls Church, VA (US)

( * ) Notice: Subject to any disclaimer, the term of this patent is extended or adjusted under 35 U.S.C. 154(b) by 0 days.

(21) Appl. No.: 16/264,956

(22) Filed: Feb. 1, 2019

(51) Int. Cl.
*G02B 6/26* (2006.01)

(52) U.S. Cl.
CPC .................................. *G02B 6/262* (2013.01)

(58) Field of Classification Search
CPC ..................................................... G02B 6/262
See application file for complete search history.

(56) References Cited

U.S. PATENT DOCUMENTS

| | | | | |
|---|---|---|---|---|
| 4,497,577 A * | 2/1985 | Sato | ....................... | G01N 21/53 250/227.23 |
| 6,249,343 B1 | 6/2001 | Wang et al. | | |
| 6,507,013 B2 | 1/2003 | Loecklin | | |
| 7,233,726 B1 * | 6/2007 | Pepper | ............... | G02B 6/02328 385/125 |
| 7,369,716 B2 * | 5/2008 | Berg | ...................... | G01V 11/00 385/12 |
| 9,476,760 B2 * | 10/2016 | Brady | .................... | G01H 9/004 |
| 9,709,730 B2 | 7/2017 | Cai et al. | | |
| 10,120,102 B2 * | 11/2018 | Tsakalakos | ......... | E21B 47/1005 |
| 10,345,223 B2 * | 7/2019 | Kwak | .................... | G01N 21/03 |
| 2013/0081447 A1 * | 4/2013 | Carter | ...................... | G01N 9/00 73/30.01 |
| 2014/0368377 A1 | 12/2014 | Nadeau et al. | | |

* cited by examiner

*Primary Examiner* — Ryan A Lepisto
(74) *Attorney, Agent, or Firm* — McCracken & Gillen LLC

(57) ABSTRACT

An exemplary gas cell is adapted to provide wavelength stability to a coherent beam of light. An optic fiber is wound in a plurality winding turns where the optic fiber transports the coherent beam of light from an input fiber end to an output fiber end. An encapsulating material engages and holds the windings in a fixed structure. A plurality of slots define severed portions of the optic fiber windings generally transverse to the windings and portions of the encapsulating material so that the optic fiber is divided into a plurality of end to end segments with open space filling the slots between respective facing ends of the severed optic fibers. A wavelength reference gas is disposed within the open space of the slots so that the beam of light passes from the input fiber end through respective facing ends of the optic fiber segments and wavelength reference gas in the corresponding slots to traverse a path through the plurality of winding turns to the output fiber end.

15 Claims, 3 Drawing Sheets

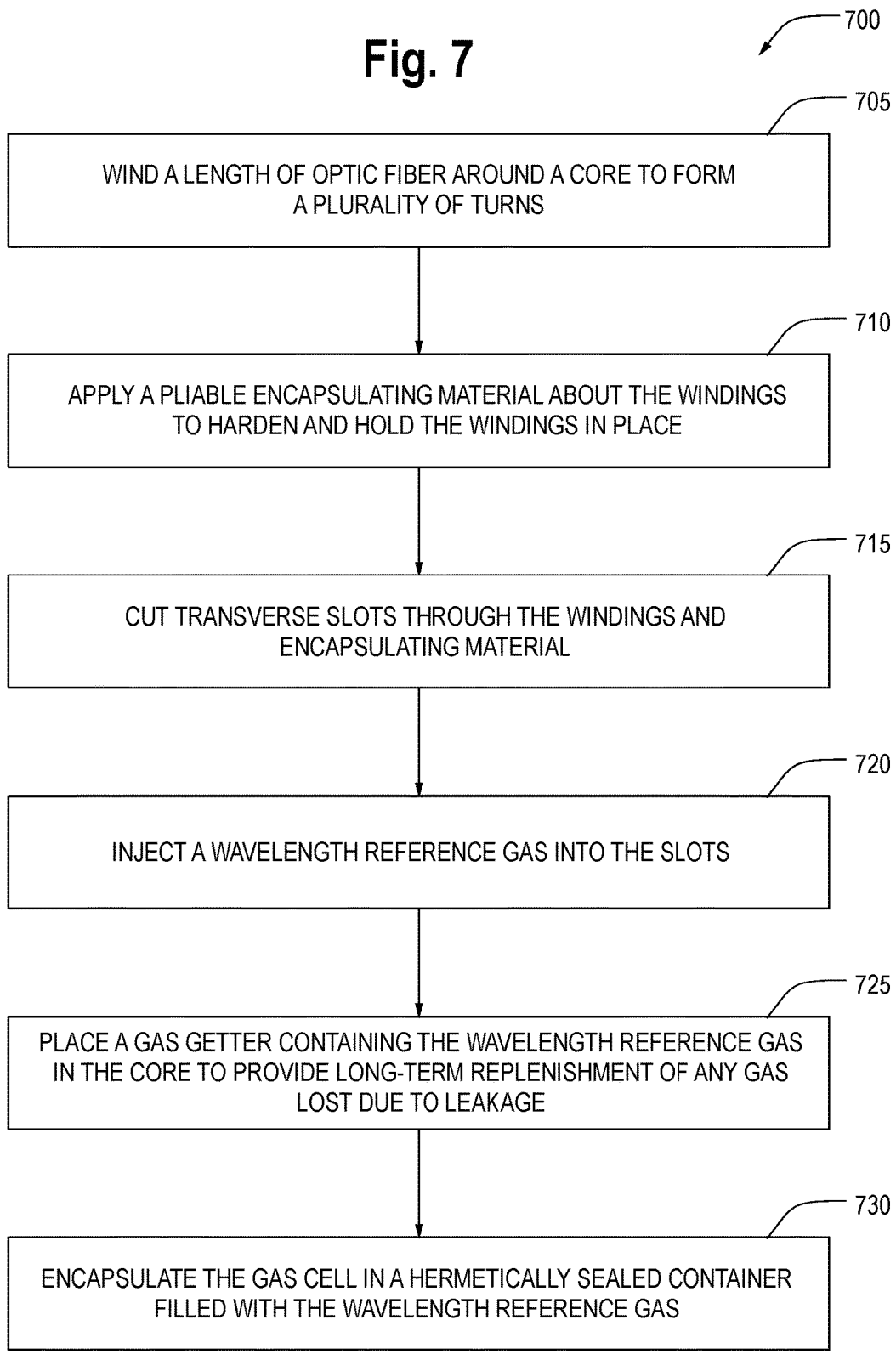

US 10,444,436 B1

GENERATION OF AN OPTICAL BEAM WITH A STABLE WAVELENGTH

BACKGROUND

Embodiments of the invention relate to a device for generating a stable optical wavelength light beam utilizing a gas cell which is especially, but not exclusively, suited for a long service life.

For encoding and decoding of optically conveyed communications as well as for other applications, an optical signal (a light beam) with a very stable wavelength, i.e. stable frequency, is desired. Known gas cells utilize an elongated cylinder filled with a gas selected to impart a selective frequency characteristic to a coherent light beam passed through the chamber. The selective frequency characteristic of the gas functions as a filter to produce a resulting light beam with a stable optical wavelength.

Providing such an optical signal is challenging in demanding environments, e.g. a long-duration space mission. As will be appreciated, physical dimensions, weight, gas leak rate to space vacuum, and tolerance to shock are all parameters that are seriously considered for components to be used on a space mission. Additionally, components must have a lifespan consistent with the overall projected life of the space mission. Thus, there exists a need for a device that can generate a long life, stable wavelength, light beam that has a small physical dimension, is light weight and is tolerant of shock and vibration.

SUMMARY

It is an object of the present invention to provide a long life stable optical wavelength generator that satisfies this need.

An exemplary gas cell is adapted to provide wavelength stability to a coherent beam of light. An optic fiber is wound in a plurality winding turns where the optic fiber transports the coherent beam of light from an input fiber end to an output fiber end. An encapsulating material engages and holds the windings in a fixed structure. A plurality of slots define severed portions of the optic fiber windings generally transverse to the windings and portions of the encapsulating material so that the optic fiber is divided into a plurality of end to end segments with open space filling the slots between respective facing ends of the severed optic fibers. A wavelength reference gas is disposed within the open space of the slots so that the beam of light passes from the input fiber end through respective facing ends of the optic fiber segments and wavelength reference gas in the corresponding slots to traverse a path through the plurality of winding turns to the output fiber end.

An exemplary method for making the gas cell is also described.

DESCRIPTION OF THE DRAWINGS

Features of exemplary implementations of the invention will become apparent from the description, the claims, and the accompanying drawings in which:

FIG. 7 is a flow diagram of an illustrative method for manufacturing the gas cell.

DETAILED DESCRIPTION

One aspect of the present invention resides in the recognition that physical dimension constraints coupled with the requirement for a long service life could best be fulfilled by a gas cell with a more compact physical structure with improved gas retention for a long service life. This concept gave rise to the gas cell embodiment of the present invention described herein.

Figure 1:
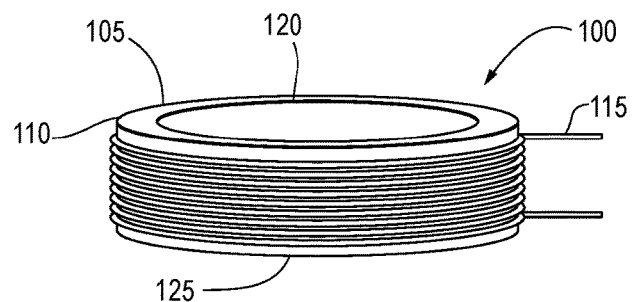
FIG. 1 is a perspective view of an embodiment of a gas cell in accordance with the present invention shown at a first stage of manufacture.

FIG. 1 shows a perspective view of an embodiment of a gas cell 100 in accordance with the present invention at a first stage of manufacture. A section of a cylinder, also referred to as a ring, 105 is made of a rigid supporting material, e.g. glass, and has a circular external surface 110. A continuous length of optical fiber 115 is wound around the external surface 110 of the ring 105 to form a plurality of windings around the ring, e.g. more than 100 turns/windings. In the illustrated embodiment the windings are constrained within the planes defined by the boundaries of the upper and lower faces 120 and 125 of the ring 105. Preferably, the outer diameter of the glass ring 105 should be greater than the recommended minimum bending diameter of the optical fiber 115 to minimize any fiber "macro bending" loss. For example, an optical fiber that uses a Corning SMF-28 fiber has a recommended minimum diameter of 50 mm.

Figure 2:
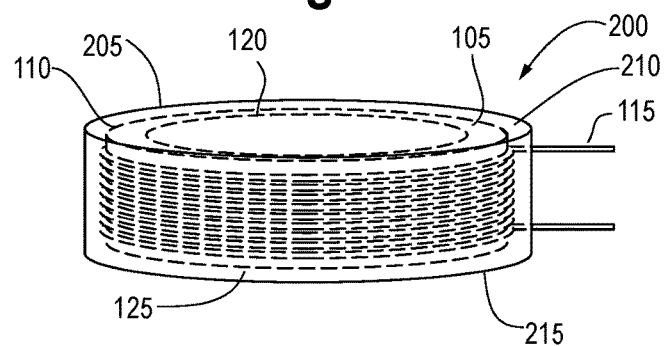
FIG. 2 is a perspective view of the gas cell embodiment at a second stage of manufacture.

FIG. 2 shows a perspective view of the gas cell embodiment 200 at a second stage of manufacture. Building upon the structure of embodiment 100, embodiment 200 includes the addition of an external layer of a molding material 205 that, once solidified, encapsulates the optical fiber windings 115 between the external circumference of the molding material 205 and the external surface 110 of the glass ring 105. The cylindrical ends 210 and 215 of the molding material 205 are substantially coplanar with the respective ends 120 and 125 of the glass ring 105.

Figure 3:
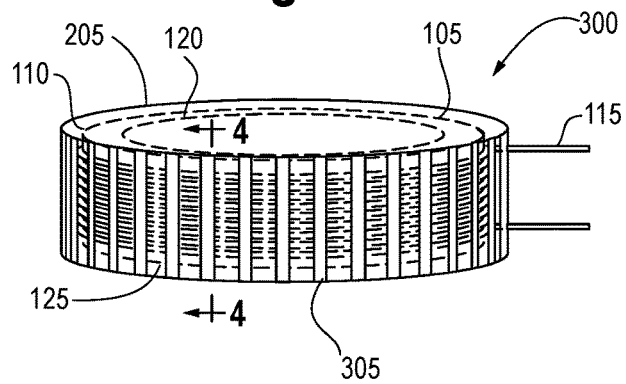
FIG. 3 is a perspective view of the gas cell embodiment at a third stage of manufacture.

FIG. 3 shows a perspective view of the gas cell embodiment 300 at a third stage of manufacture. Building upon the structure of embodiment 200, embodiment 300 includes a plurality of spaced apart slots 305 generally parallel to the axis of the glass ring 105. Each of the slots 305 represents the removal of a strip of the molding material 205 and the severing and removal of the portion of the optical fiber windings 115 within the strip. This results in separating the original continuous fiber winding into a large number of fiber segments having ends of the fiber segments that are exposed to the space of the slots. Various techniques such as mechanical machining can be used to make the slots. Preferably, the slots are exposed to a chemical etchant to remove any machining strain at the severed ends of the fiber. Since a continuous original fiber was utilized, the respective end faces of each winding segment are automatically aligned to one another without requiring any additional external alignment. Preferably, the slots are made at a slight angle, e.g. about 8°, relative to the axis of the glass ring to reduce Fresnel reflections from end faces of the optic fiber.

Figure 4:
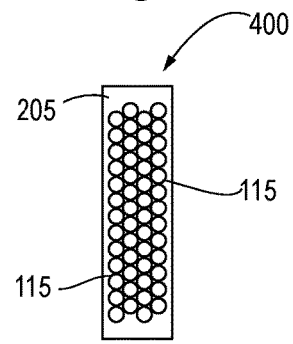
FIG. 4 is a cross-sectional view taken about the line 4-4 of FIG. 3.

FIG. 4 is a cross-sectional view showing a section 400 taken about the line 4-4 within a longitudinal centerline a slot 305 of embodiment 300. In this illustrative example the cut ends of the fiber optics 115 are seen protruding from the molding material 205. The view that would be seen from line 4-4 looking 180° opposite to that shown in FIG. 4 would be substantially the same with the ends of the fibers aligned with the respective ends as seen in FIG. 4. In this example there are 4 contiguous columns of winding layers of the fibers. As will be explained in more detail below, each of the slots is filled with a wavelength reference gas so that each of the slots becomes a small gas cell.

Figure 5:
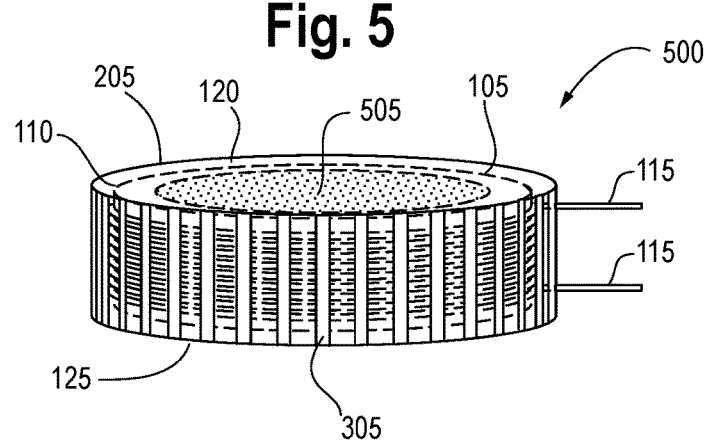
FIG. 5 is a perspective view of the gas cell embodiment at a fourth stage of manufacture.

FIG. 5 shows a perspective view of the gas cell embodiment 500 at a fourth stage of manufacture. Adding to the embodiment 300, embodiment 500 includes a gas absorber (gas getter) 505 disposed in the center of the glass ring 105. With the gas absorber 505, e.g. activated carbon, silica gel, zeolites, or other sieves, exposed to and absorbing the wavelength reference gas (as will be described with regard to FIG. 6), the gas absorber 505 serves as a supply source of the wavelength reference gas, e.g. acetylene, water, hydrogen fluoride, carbon monoxide, hydrogen cyanide, etc., over an extended service life of the gas cell. That is, the gas absorber 505 releases previously absorbed wavelength reference gas to replace any gas lost due to small amounts of leakage over extended periods of time, e.g. many years.

Figure 6:
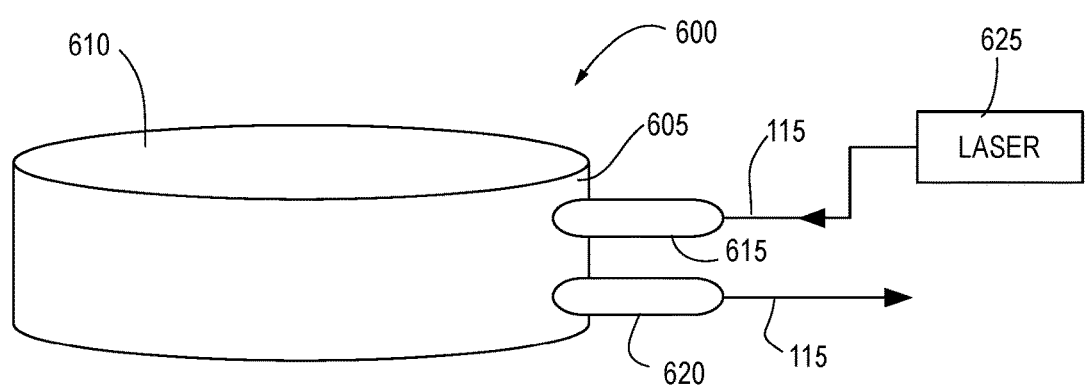
FIG. 6 is a perspective view of the manufactured gas cell embodiment illustrating an exemplary usage.

FIG. 6 shows a perspective view of a final gas cell embodiment 600 illustrating an exemplary usage. The embodiment 500 is hermetically sealed inside a robust enclosure, e.g. made of metal, consisting of a container 605 and a top lid 610 hermetically sealed to the container 605. The container 605 includes hermetically sealed feedthrough ports 615 and 620. The optic fiber 115 coupled to feedthrough port 615 carries a light beam generated by laser 625 and the optic fiber 115 coupled to feedthrough port 620 carries the output light beam with wavelength stabilization provided by the gas cell 600. From a manufacturing perspective, the embodiment 500 can be placed within the container 605 with the entirety of the embodiment 500 and the interior of container 605 being filled with the wavelength reference gas. Then the lid 610 is hermetically sealed to the container 605 causing the wavelength reference gas to be disposed within each of the slots 305 and to have been absorbed by the gas absorber 505. The pressure of the wavelength reference gas within the embodiment 600 is kept sufficiently low so that the gas absorption with remains narrow to provide excellent wavelength resolution and precision wavelength locking. The gas selected will have absorption lines corresponding with the wavelength/frequency to produce the desired stable wavelength light beam.

The effective length of the wavelength reference gas to which the light beam is exposed can be calculated:
width of each slot times
number of slots times
number of optic fiber windings.

Therefore, in a relatively small robust structure, a beam of light can be exposed to a substantial quantity of wavelength reference gas which gives rise to a light beam with a stable fixed wavelength.

FIG. 7 shows a flow diagram of an illustrative method 700 for manufacturing the gas cell. In step 705 a continuous length of optic fiber is wound around a core form a plurality of turns about the core. As an alternative, the optic fiber may be wound to form a number of turns without utilizing a core. In step 710 a pliable encapsulating material is applied about the windings that will harden and hold windings in place. Transverse slots are cut through the windings and the hardened encapsulating material in step 715. This severs the optic fiber windings into a plurality of end-to-end segments separated by the respective slots. In step 720 a wavelength reference gas is injected into the slots so that a beam of light entering the input fiber end passes between the respective facing ends of the optic fiber segments through the wavelength reference gas contained in the slots to exit at the output fiber end. Although the gas cell may have a relatively small physical dimension, the effective length of wavelength reference gas traversed by the light beam is substantial.

Following steps are believed to be beneficial in many applications but may not be required depending on the environment of the gas cell. In step 725 a gas getter containing the wavelength reference gas is placed in the core to provide a long-term replenishment of any gas loss due to leakage. That is, the gas getter will emit the wavelength reference gas to replenish any gas in the slots lost due to leakage. In step 730 the gas cell is encapsulated in a hermetically sealed container filled with the wavelength reference gas. Preferably, the gas getter filled with the wavelength reference gas is contained within the sealed container to offset any long-term gas leakage from the container.

Although exemplary implementations of the invention have been depicted and described in detail herein, it will be apparent to those skilled in the art that various modifications, additions, substitutions, and the like can be made without departing from the spirit of the invention. For example, structures that are other than circular could be utilized to fabricate a reduced size gas cell, e.g. devices with a square or other geometric shape or cross-section. Additionally, a spiral or tapering structure could be utilized to support multiple windings of optic fibers with appropriate located and sized slots to provide exposure to the reference wavelength gas. Various three-dimensional structures based on multiple slots or gaps between respective ends of optic fibers where the slots or gaps are filled with the reference wavelength gas could be utilized to achieve a compact gas cell. A plurality of windings of optic fibers could be directly encapsulated within a molding material without the use, or at least a final use, of an interior core if the remaining molding material that remains after cutting the slots provides sufficient rigidity and strength.

The scope of the invention is defined in the following claims.

The invention claimed is:

1. A gas cell adapted to provide wavelength stability to a coherent beam of light comprising:
   an optic fiber wound in a plurality winding turns where the optic fiber transports the coherent beam of light from an input fiber end to an output fiber end;
   an encapsulating material that engages and holds the windings in a fixed structure;
   a plurality of slots define severed portions of the optic fiber windings generally transverse to the windings and portions of the encapsulating material so that the optic fiber is divided into a plurality of end to end segments with open space filling the slots between respective facing ends of the severed optic fibers;
   a wavelength reference gas disposed within the open space of the slots;
   the beam of light passing from the input fiber end, through respective facing ends of the optic fiber segments and wavelength reference gas in the corresponding slots to traverse a path through the plurality of windings to the output fiber end.

2. The gas cell of claim 1 further comprising a core about which the optic fiber windings are wound, the core and the encapsulating material cooperating to engage and hold the winding in the fixed structure.

3. The gas cell of claim 2 wherein the core is made of glass.

4. The gas cell of claim 1 further comprising a hermetic sealable container that encloses the optic fiber windings, the encapsulating material including the slots, and the wavelength reference gas, the input fiber end and the output fiber end extending outside of the sealable container.

5. The gas cell of claim 2 further comprising a hermetic sealable container that encloses the optic fiber windings, the core, the encapsulating material including the slots, and the wavelength reference gas, the input fiber end and the output fiber end extending outside of the sealable container.

6. The gas cell of claim 1 further comprising a gas absorber that is exposed to and absorbs the wavelength reference gas, gas absorber serving as a supply of wavelength reference gas to replace any loss of wavelength reference gas due to leakage.

7. The gas cell of claim 4 further comprising a gas absorber that is exposed to and absorbs the wavelength reference gas, gas absorber serving as a supply of wavelength reference gas to replace any loss of wavelength reference gas from the container due to leakage.

8. The gas cell of claim 2 wherein the core is a section of a cylinder that has an external circumference about which the optic fiber is wound.

9. The gas cell of claim 1 further comprising a laser that couples the coherent beam of light to the input fiber end of the optic fiber.

10. A method for making a gas cell adapted to provide wavelength stability to a coherent beam of light, the method comprising the steps of:

winding an optic fiber around a core to form a plurality of turns around the core where the optic fiber is disposed to transport the coherent beam of light from an input fiber end to an output fiber end;

disposing a pliable encapsulating material about the windings which hardens to hold the windings about the core in a fixed structure;

cutting a plurality of slots through the encapsulating material and windings that define severed portions of the optic fiber windings generally transverse to the windings and portions of the encapsulating material so that the optic fiber is divided into a plurality of end to end segments with open space filling the slots between respective facing ends of the severed optic fibers;

disposing a wavelength reference gas within the open space of the slots so that the beam of light will pass from the input fiber end through respective facing ends of the optic fiber segments and wavelength reference gas in the corresponding slots to traverse a path through the plurality of windings to the output fiber end.

11. The method of claim 10 wherein the core is made of glass.

12. The method of claim 10 further comprising enclosing the gas cell in a hermetic sealable container so that the input fiber end and the output fiber end extend outside of the sealable container.

13. The method of claim 10 further comprising inserting a gas absorber that is exposed to and absorbs the wavelength reference gas, gas absorber serving as a supply of wavelength reference gas to replace any loss of wavelength reference gas due to leakage.

14. The method of claim 12 further comprising inserting a gas absorber that is exposed to and absorbs the wavelength reference gas, gas absorber serving as a supply of wavelength reference gas to replace any loss of wavelength reference gas from the container due to leakage.

15. The method of claim 10 wherein the core is a section of a cylinder that has an external circumference about which the optic fiber is wound.

\* \* \* \* \*